US006969114B2

(12) United States Patent
Keilhauer

(10) Patent No.: US 6,969,114 B2
(45) Date of Patent: Nov. 29, 2005

(54) TOTAL SPINAL SUPPORT

(76) Inventor: Ed Keilhauer, 1450 Birchmount Road, Scarborough, Ontario (CA) M1P 2E3

( * ) Notice: Subject to any disclaimer, the term of this patent is extended or adjusted under 35 U.S.C. 154(b) by 277 days.

(21) Appl. No.: 10/165,683

(22) Filed: Jun. 7, 2002

(65) Prior Publication Data

US 2003/0227201 A1 Dec. 11, 2003

(51) Int. Cl.[7] .................................................. A47C 7/02
(52) U.S. Cl. ............................. 297/230.1; 297/452.34; 297/452.3
(58) Field of Search ........................ 297/230.1, 230.12, 297/230.13, 230.14, 352, 396, 452.29, 452.3, 297/452.31, 452.32, 452.33, 452.34, 452.35, 297/452.36

(56) References Cited

U.S. PATENT DOCUMENTS 2,215,540 A * 9/1940 Breuer
2,807,313 A 9/1957 Kaufman .................... 155/174
2,990,008 A 6/1961 Bien .......................... 155/177
3,156,500 A 11/1964 Kerr ........................... 297/391
3,177,036 A * 4/1965 Halter
3,361,471 A 1/1968 Radford ...................... 297/230
3,454,302 A 7/1969 Radford ...................... 297/230
4,300,249 A * 11/1981 Taylor
4,535,495 A * 8/1985 Oldfield
4,556,254 A * 12/1985 Roberts
4,572,578 A * 2/1986 Perkins
4,864,668 A 9/1989 Crisp ............................ 5/432
4,911,502 A 3/1990 Gorman ...................... 297/460
5,114,209 A 5/1992 Dunn ......................... 297/231
5,248,182 A 9/1993 Hittie ......................... 297/230
5,316,375 A * 5/1994 Breen
5,344,211 A * 9/1994 Adat et al.
5,564,788 A * 10/1996 Warhaftig
5,580,124 A * 12/1996 Dellanno
5,707,108 A * 1/1998 Pi
5,988,757 A * 11/1999 Vishey et al.

FOREIGN PATENT DOCUMENTS

EP 536868 * 4/1993

OTHER PUBLICATIONS

Joseph A. Koncelik, "Designing Seating For An Aging Population" at the Internet website at http://www.arch.gatech.edu/crt/news/seating.htm, dated Nov. 19, 2001.
"More a Lifestyle Than A Seat," Automotive Engineer magazine, Jan. 1, 1998, 2 pgs., vol. 23, No. 1.
B.J.G. Andersson, et al., "Lumbar Disc Pressure and Myoelectric Back Muscle Activity During Sitting," 1974, 12 pgs., Scand J. Rehab Med 6:104-114, Gunnar Andersson, (Continued)

*Primary Examiner*—Milton Nelson, Jr.
(74) *Attorney, Agent, or Firm*—Robert J. Ward; Gardere Wynne Sewell LLP

(57) ABSTRACT

A support device for use in supporting a user's spine while in a seated position, including lower, top and intermediate sections merged smoothly in a rigid piece. The device extends the entire length of the user's spine from occipital region to coccyx, and includes lateral support for maintaining a centered spinal position. The device preferably sits on the seat of a chair or automobile seat and leans against the back of the seat to support the user's spine. The intermediate section of the device is preferably narrow to sit flush with the user's back between the shoulder blades (scapulae) and allowing the user to rotate to either side in the seat. The support is preferably constructed with a flocked or fabric-covered foam exterior over a rigid plastic armature.

11 Claims, 7 Drawing Sheets

OTHER PUBLICATIONS

M.D. Depart. Of Orthopaedic Surgery I, Sahlgrenska sjukhuset, S-413 45 Goteborg, Sweden.

Donald D. Harrison, et al., "Sitting Biomechanics, Part II: Optimal Car Driver's Seat and Optimal Driver's Spinal Model," Journal of Manipulative and Physiological Therapeutics, Jan. 2000, vol. 23, No. 1.

"Discoveries . . . Leap Chair Ergonomic Chairs," miscellaneous advertisements for Leap Chair at the Internet website at http://www.leap-chair.com, 36 pgs.

"The Iliac Vehicle Seat," at the Internet website at http://www.iliac.co.uk/vehicle.htm, 8 pgs.

* cited by examiner

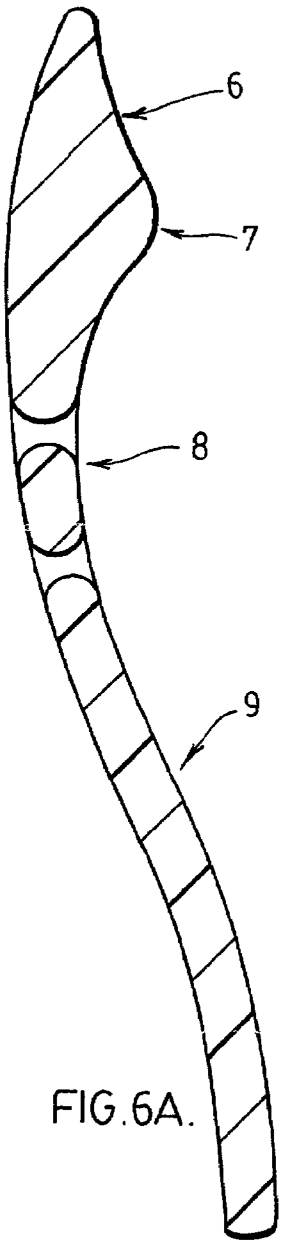
FIG.6A.
FIG.6B.
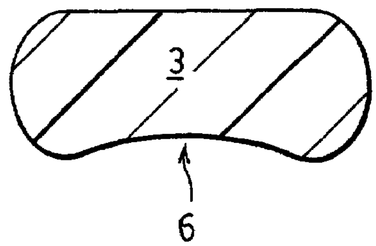
FIG.6C.
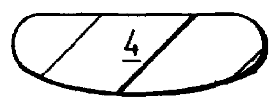
FIG.6D.
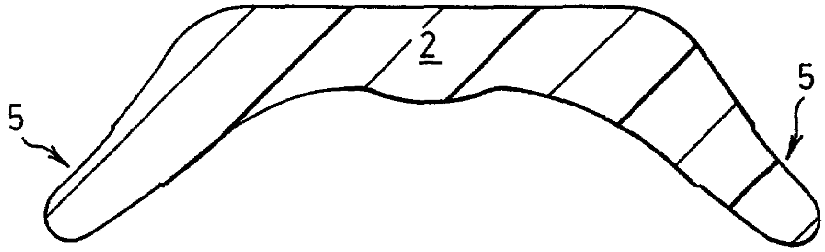

TOTAL SPINAL SUPPORT

FIELD OF THE INVENTION

The invention relates to therapeutic supports, and more particularly, to spinal supports.

BACKGROUND OF THE INVENTION

It has long been recognized that back pain can be caused or aggravated by extended periods of sitting—either in a chair or in an automobile seat. Left unsupported, the human spine will tend to react gravitationally placing stress on the vertebrae.

Improper sitting posture not only contributes to back pain but also has an impact on other physiological functions, including circulation, respiration, and visceral functions. Current research indicates that the preferred sitting position is one in which the pelvis is tilted back creating an oblique angle between the upper legs and torso. Lumbar support at around L3 has traditionally been recommended to create this angle.

In addition, it is recognized that freedom of movement is important to maintain circulation, and to increase comfort. In an automobile, there are other seating considerations including visibility, ergonomic access to hand and foot controls, mirror visibility, the ability to shoulder check, and safety.

The human spine is commonly considered to have several distinct sections: cervical, thoracic, lumbar, sacral and coccygeal. Past attempts to provide spinal support in a seated position have focussed on particular spinal sections:

lumbar—see U.S. Pat. No. 5,114,209 to Dunn;

thoracic—see U.S. Pat. No. 4,864,668 to Crisp;

cervical—see U.S. Pat. No. 3,156,500 to Kerr; and U.S. Pat. No. 5,248,182 to Hittie.

These partial supports ignore the interconnectedness of the spine and the beneficial effects of supporting the entire spine.

In automobile seating, attention has also been focussed on whiplash prevention. This is not so much a support concern, as it is a barrier concern, to stop the head/neck from hinging backward in the event of a collision or other sudden impact. See, for example, U.S. Pat. No. 2,807,313 to Kaufman; and U.S. Pat. No. 2,990,008 to Bien. However, these whiplash "supports" do not address the rest of the spine.

There have been attempts to support the entire spine, however these are not therapeutically optimal, for several reasons. U.S. Pat. No. 3,454,302 to Radford features an unnatural spinal curve, and the support extends to meet the head and shoulders at an exaggerated angle, which would promote neither comfort nor therapeutic benefit for the user. U.S. Pat. No. 3,361,471 to Radford fails to provide head support above the neck curve.

A chair design put forward by the Steelcase Corporation (the LEAP™ Chair) offers a chair with a useful degree of mobility and may, in some models, extend all the way up to meet the head. However, the chair does not include lateral support.

Another chair design put forward by Mr. John Gorman of the Iliac Vehicle Seat Company (UK) identifies the need for an iliac support in providing spinal support in automotive seating, however, the Iliac Vehicle Seat design does not provide for a lateral support coupled with lumbar support.

There is an outstanding need for a support that traces the entire spine, in addition to providing iliac support. In automotive use, lateral iliac support has the advantage of supporting the hips to stabilize the entire spinal column. It has also been identified that hip support is critical in providing adaptive seating for older persons. Too much weight placed over the hips, without adequate lateral support, can cause pressure and scrubbing of the bone against the tissue at the base of the hips. This tissue becomes thinner as people age. See J. A. Koncelik, "Designing Seating for an Aging Population", Center for Assistive Technology and Environmental Access, Georgia Institute of Technology.

SUMMARY OF THE INVENTION

According to a first aspect of the invention, a support device is provided for use in supporting a user's spine while in a seated position. The device comprises:

a lower section;

a top section; and an intermediate section extending between the lower section and the top section.

The lower, top and intermediate sections of the device merge smoothly with each other in a rigid piece, the device extending along the entire length of the user's spine from the user's occipital region to the user's coccygeal region. The device includes lateral support for maintaining a centred spinal position. The device preferably features a sinuously curved front surface following the contours of the human spine.

Preferably, the lower section of the device extends laterally on both sides of the centre of the device beyond the width of the intermediate section and curves toward the user on both sides to form two iliac support wings. The iliac support wings preferably provide lateral support.

The intermediate section preferably comprises a spinal support member sufficiently narrow:

(a) to lie substantially flush with the user's back proximate to the user's spine in a space formed between the user's scapulae; and/or (b) to permit the user's shoulders to rotate substantially without obstruction in a sideward direction, while giving continued full spinal support.

The top section preferably comprises a first concavity and a first convexity. The first concavity may be adapted to receive and support the rear of the user's head proximate to the user's occipital region. The first convexity comprising a neck-supporting ridge formed on the front surface of the device may be adapted to receive and support the user's cervical spine. The ridge preferably merges smoothly with the concavity.

The intermediate section preferably comprises a second concavity and a second convexity on the front surface of the device. The second concavity is preferably adapted to receive and support the user's thoracic spine. The second convexity is preferably adapted to receive and support the user's lumbar, sacrat and coccygeal spines. The second convexity preferably merges smoothly with the second concavity.

The device preferably includes a flat base surface for resting the device upon the seat of a chair or automobile seat to support the user's spine when in a seated position and to ensure that the device lines up with the appropriate section of the spine.

The device preferably is made up of a rigid plastic armature. The exterior of the armature may be substantially covered with a foam exterior. The exterior of the foam may be flocked or may be covered with a fabric cover.

The device preferably comprises at least one hole in the device for permitting air circulation to the user's back.

According to a second aspect of the invention, a method is provided for supporting a user's spine while the user is in a seated position. The method comprising providing the user with a support device as such device is described above.

According to a third aspect of the invention, a use is provided for support device in supporting a user's spine while the user is in a seated position. The device comprises a support device as such device is described above.

BRIEF DESCRIPTION OF THE FIGURES

In order that the invention may be more clearly understood, the preferred embodiment thereof will now be described by way of example with reference to the accompanying drawings, in which:

FIG. 6A is a cross-sectional view of the spinal support according to FIG. 2, through line A—A;

FIG. 6B is a cross-sectional view of the spinal support according to FIG. 2, through line B—B;

FIG. 6C is a cross-sectional view of the spinal support according to FIG. 2, through line C—C;

FIG. 6D is a cross-sectional view of the spinal support according to FIG. 2, through line D—D.

DETAILED DESCRIPTION OF THE FIGURES

Figure 1:
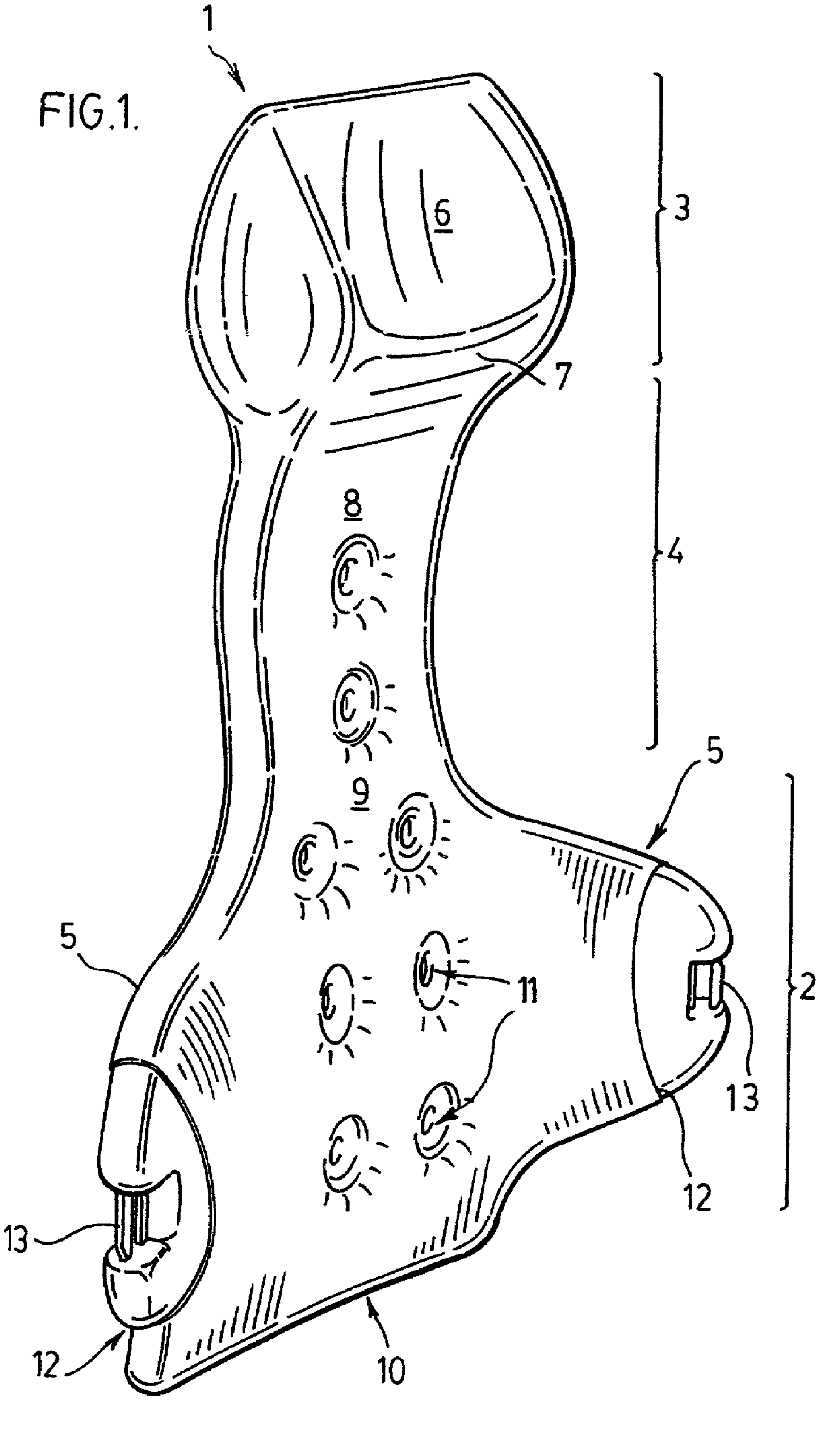
FIG. 1 is a front perspective view of a spinal support according to the preferred embodiment.

Referring to the preferred embodiment of the invention as shown in FIGS. 1–6D, there is shown in FIG. 1 a spinal support device 1 with enhanced ability to support the spine of a user while in a seated position, such as in a chair, or in an automobile seat. The support 1 has the general shape of an inverted T, having the widest portion toward the bottom.

In construction, the device preferably includes an armature comprising a unitary piece of rigid plastic, such as an injection-molded plastic-fibreglass composite. For added strength, it may also be useful to reinforce the armature with internal reinforcements. The rigidity of the device is important in that it must hold its shape irrespective of the contour of the seat back against which it will be placed. Rigidity is also important in that the device may also serve as an auxiliary head rest in an automobile, in which case the support will provide additional whiplash prevention benefits and may provide beneficial shock absorption of whole body forces in event of sudden impact.

The device is preferably constructed with a flocked foam exterior over the plastic armature. The foam is preferably 1 to 4 centimeters in thickness. Alternatively, the device may be provided with a fabric cover and/or one or more cushion attachments. Fabric covers are useful in that they allow cleaning. The foam is preferably of a thickness to provide beneficial dampening of normal automotive vibrations.

In shape, the device 1 has three basic body sections (as shown in FIG. 1): a lower section 2, a top section 3, and an intermediate section 4 extending between the lower section and top section. Lateral "wings" 5 on either side of the lower section extend outward and curve slightly forward of the vertical plane formed generally by the support 1. The base 10 of the support 1 is preferably a flat, broad surface. The device 1 is preferably strapped to the back of a chair or automobile seat (not shown) at a vertical position selected to engage the user's spinal curves most closely. The vertical positioning is adjustable to suit the user's height and torso length. Preferably, the device will also be provided in a range of sizes, and may in fact be custom-fitted to the particular dimensions of the individual user.

Figure 2:
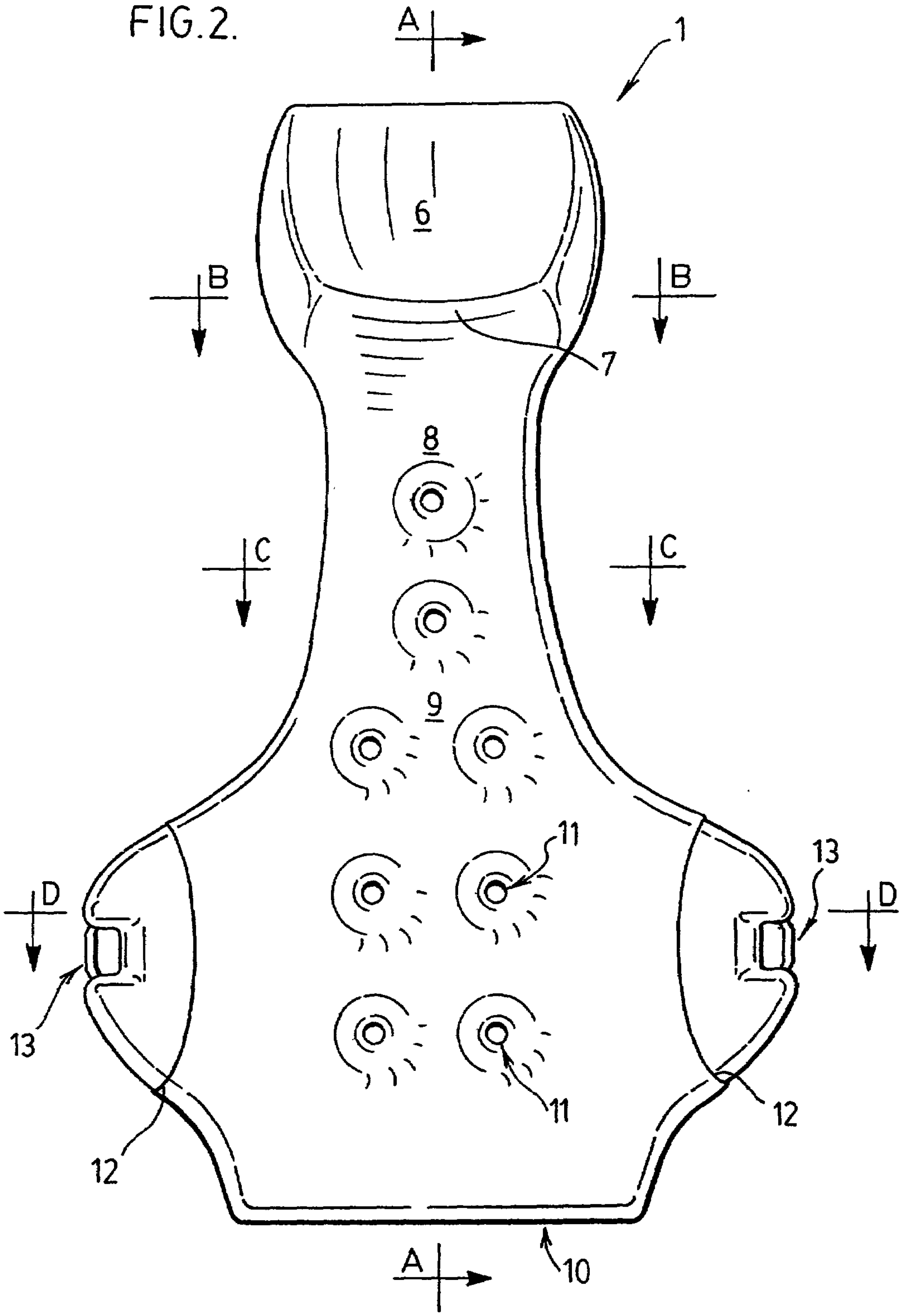
FIG. 2 is a front view of the spinal support.
Figure 7:
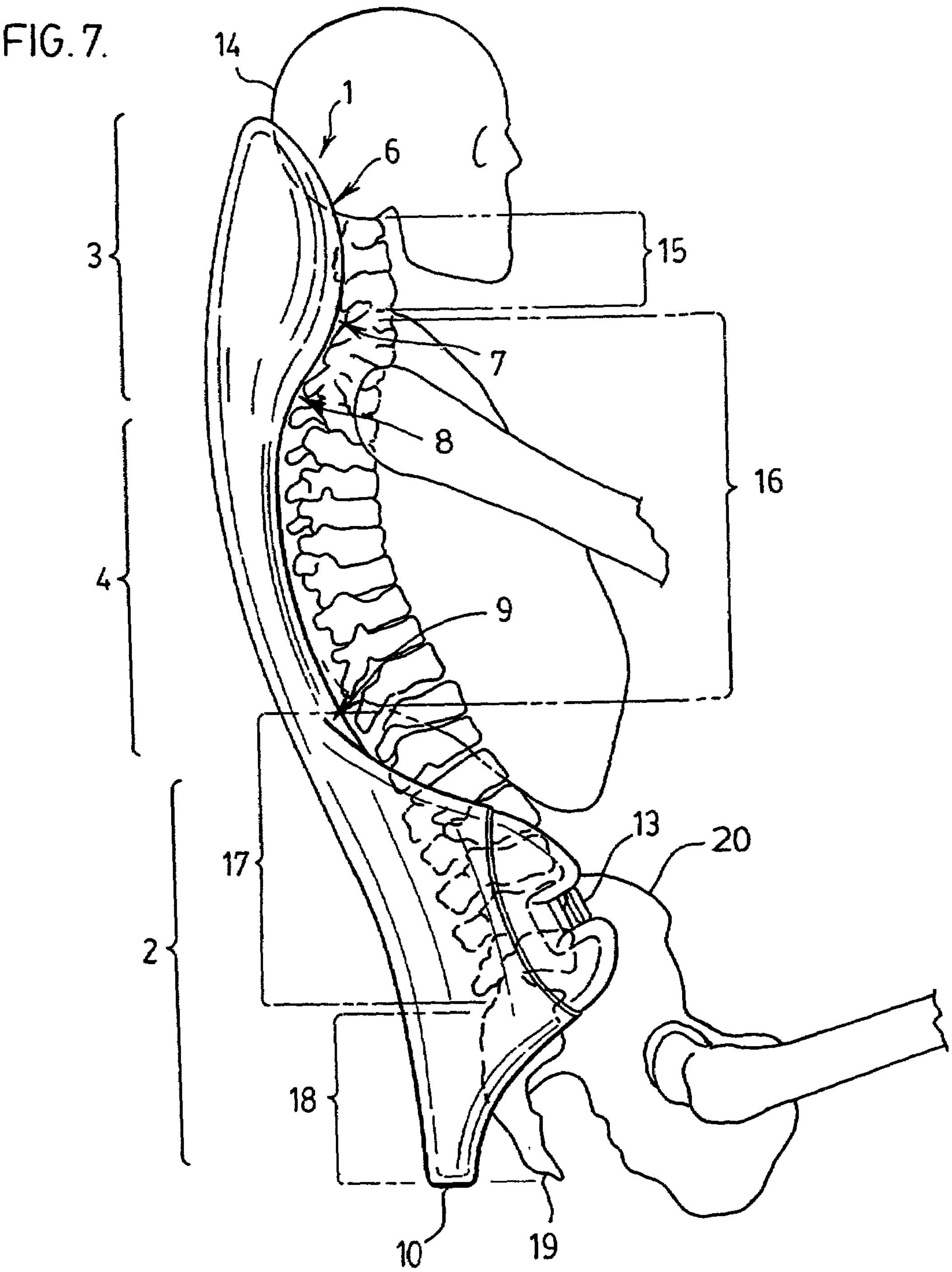
FIG. 7 is a left side view of the spinal support showing skeletal outline of preferred human user placement when in use.

The support 1, which is intended to follow the natural curves of the human body, preferably features a sinuously curved front surface. The overall curves of the front surface can be comprehended from the side views in FIG. 4 (support alone) and FIG. 7 (with user), and with reference to FIG. 6A, which is a cross-sectional view of the support 1 along line A—A of FIG. 2. In particular, the top section 3 of the support includes a generally bowl-shaped concavity 6 adapted to receive the back of the user's head. The bowl 6 preferably contacts the user's head at the occipital plate 14 and extends below the occipital projection to meet the top of the spinal column. FIG. 6B, a cross-sectional view of the support along line B—B of FIG. 2, shows the curvature of the head-receiving bowl 6 where it meets a neck-receiving ridge 7. Moving down the top section 3, a ridge-shaped convexity 7 merges smoothly with the bowl 6 to receive the back of the user's neck proximate to the cervical spine 15. The ridge 7 tapers downward to join the intermediate section 4 of the support.

Where the user's thoracic spine 16 approaches the support 1, a concavity 8 is provided in the support, the concavity merging smoothly with the neck-receiving ridge 7. Moving down the intermediate section 4 into the lower section 2, the concavity 8 gradually transitions to a convexity 9 in the support for receiving the user's lower back proximate to the thoraco-lumbar spine 17. The convexity 9 is preferably positioned higher than traditional lumbar supports (between approximately T10 and L1 depending on the size and position of the user). All of the curves in the support 1 are designed to mirror the user's spine in its natural form, without unnaturally extending or contracting any particular joint or any particular region of the spine. The regions of the spine as support by the device can be more clearly seen in FIG. 7 showing a skeletal outline of a user in preferred position against the device.

At the lower section 2, the support's lateral wings 5 extend outwardly and slightly forward to meet the user's pelvis 20. The lower section 2 with the lateral wings 5 has a preferably rounded shape to partially "hug" the user's lower back and hips. This is best shown in the side view in FIG. 4, and the top and bottom views in FIG. 5A–FIG. 5B.

Figure 3:
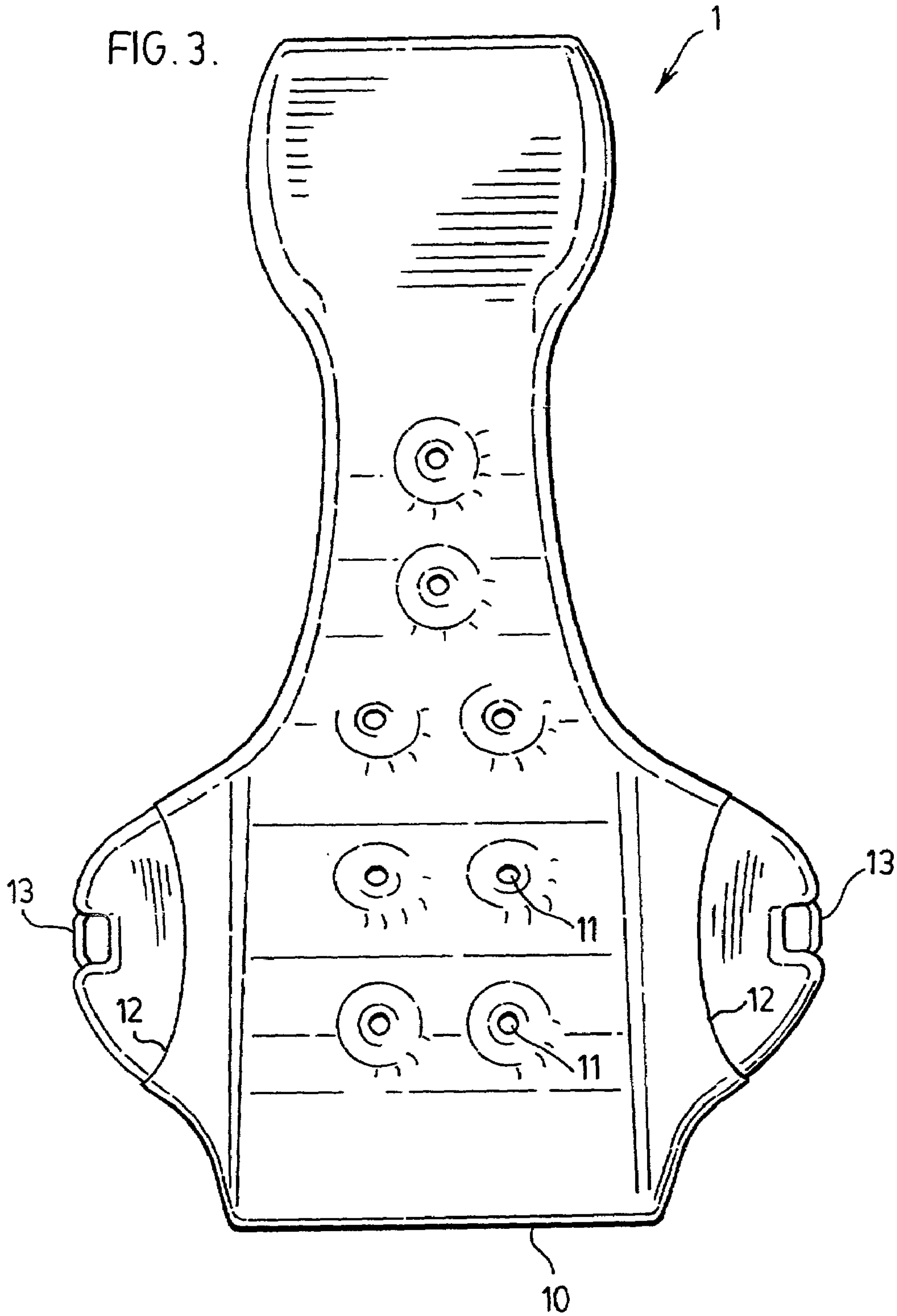
FIG. 3 is a rear view of the spinal support.
Figure 4:
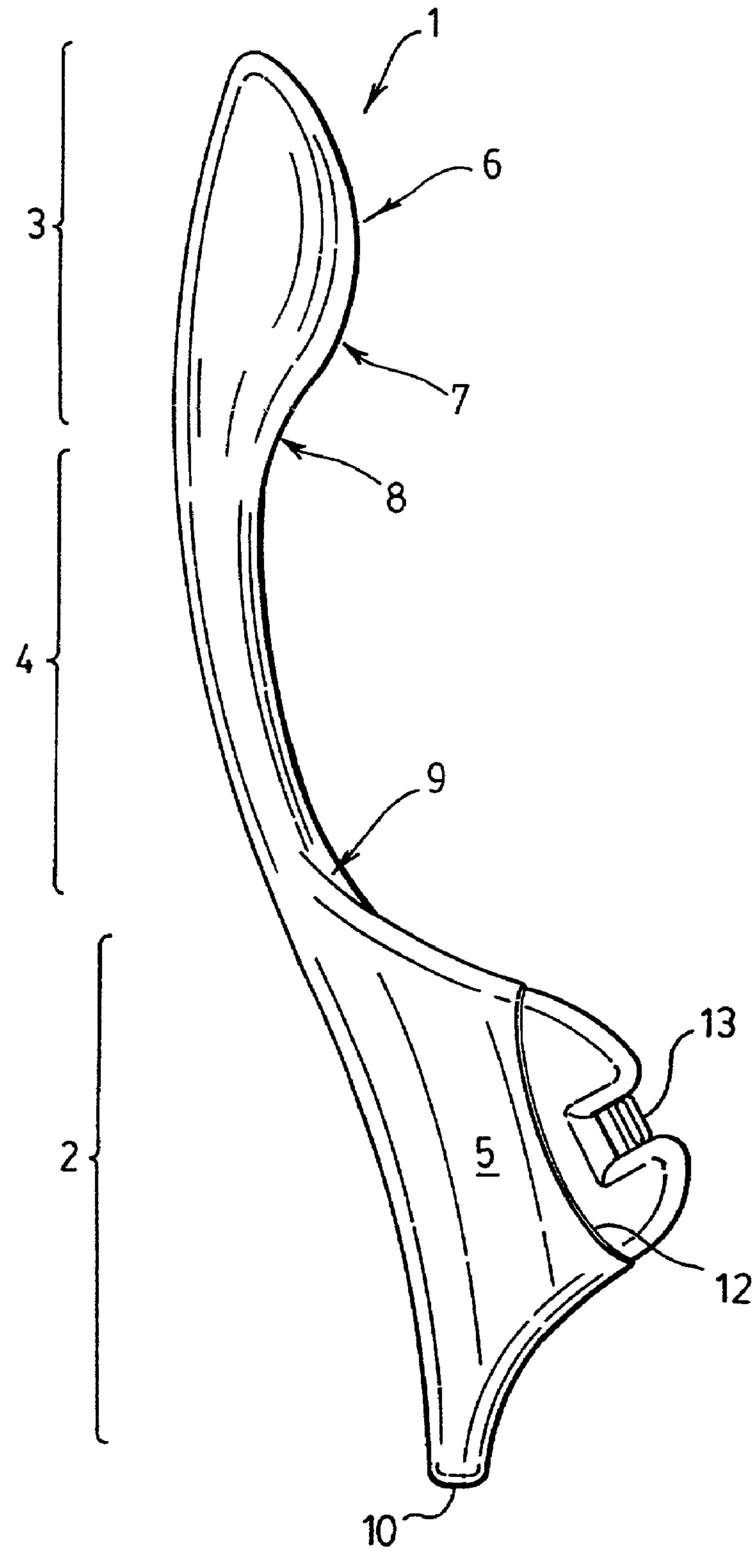
FIG. 4 is left side view of the spinal support.
Figure 5A:
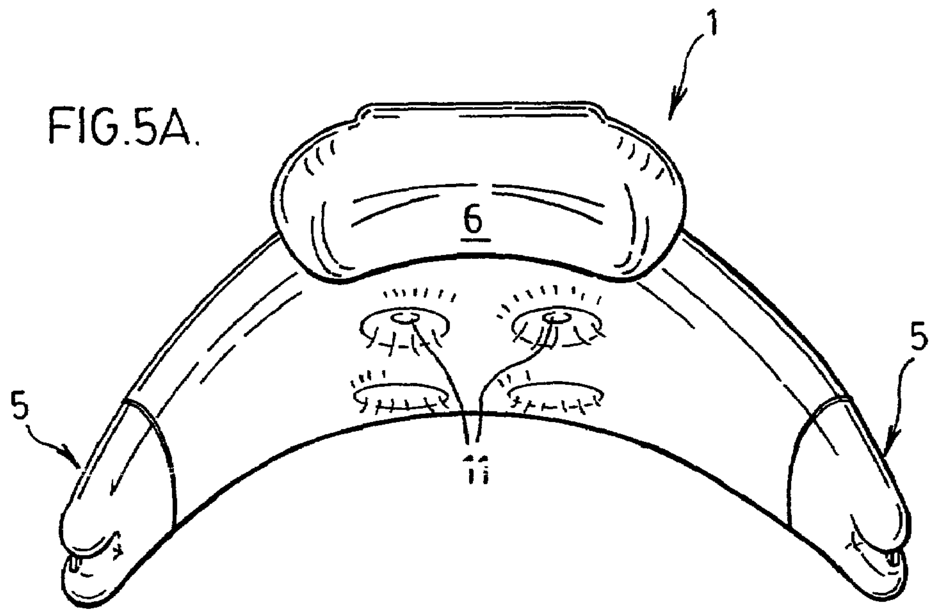
FIG. 5A is a top perspective view of the spinal support from the front.
Figure 5B:
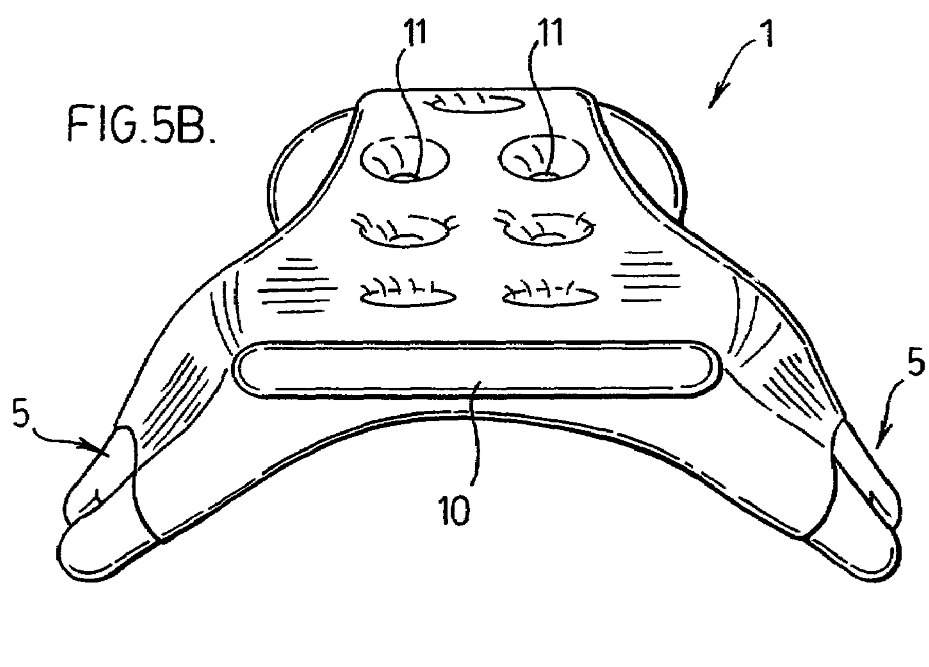
FIG. 5B is a bottom perspective view of the spinal support from the rear.

The shape of the back surface of the support 1 is not critical to the invention. However, it has been found that a relatively flat back surface (except the lateral wings which taper forward) has the advantage of sitting flush with the back of a chair or automobile seat. A preferred back surface is shown in FIG. 3. The intermediate section 4 is preferably a relatively narrow upright piece (between 13 and 15 centimeters in width) for improved flush positioning against seat backs of varying contours and configurations and to retain full spinal support between the user's shoulder blades.

The support 1 is provided with ventilation holes 11 at various places over the surface of the support to allow air to travel through the support to the user's back. The holes assist in preventing perspiration build-up to improve user comfort. The number and arrangement of holes 11, and the shape of the holes is not critical. However, it has been found useful to provide approximately six to ten holes in an arrangement similar to that shown in FIG. 1. A skilled worker would appreciate that the number and size of the holes is limited only to the extent that the holes should not interfere with the overall smoothness of the surface to the detriment of the user's comfort, nor should the holes compromise the structural strength of the support.

In use, the support works by balancing and distributing the forces acting on the human spine in a seated posture, and reducing disc pressure on any particular section of the spine (e.g. lumbar region). Starting at the lower section 2, the lateral wings 5 counter pressure the iliac bones 20, tending to prevent excessive posterior pelvic tilt and centering the lower spine against the support (to obtain maximum benefit of the support by limiting spinal rotation through the vertical axis). The lumbar support 9 provided by the device is moved cephalad (higher than traditional lower-back supports), to encourage mild extension of the thoraco-lumbar curve (lordosis) 16, which has been found to help force the shoulders back and against slouching tendancy. The posture promoted is a comfortable, correct seating position. The narrow intermediate section 4 is also useful in ensuring that the support contacts the spine and is not pushed away by the outward projection of the user's scapulae (shoulder blades).

The thoracic support 8 provided is narrower than traditional back rests to allow the user substantial freedom of shoulder movement. The ability to pivot for shoulder checks is a key advantage of the support 1 in use in automobiles. However, it has been found that an overly narrow intermediate section 4 (i.e. narrower than approximately 13 centimeters) may lead to undesirable slippage off the support, reducing its supportive effects.

The head support 3 provided cradles the back of the head and neck, holding the head sub-occipitally to reduce the effects of gravity and preserving the natural lordosis of the cervical spine 15.

The top, intermediate and lower sections of the support work together as the mechanics of the spine are interrelated. Movement in the spine in one area must be compensated by another. The vertebral segments (cervical, thoracic, lumbar, sacral, coccygeal) work together. The principle of the invention is to create stability and reduce the gravitational stress of seated postures. However, the invention allows for motion of the user while sitting (a range of "natural" spinal postures are supported), which is considered to be beneficial for promoting circulation and reducing the spinal loads which may lead to back pain.

It is a preferred embodiment of the support to enable use in automobile seating. To use the support in a car seat, an attachment system 13 is provided on the lateral wings 5. The attachment system 13 allows the support 1 to be securely maintained at a vertical position that coincides with the user's spinal curves. In the preferred embodiment, left and right straps are provided (not shown), which are attached through the right and left attachment openings 13 (such as by looping an end of each strap through the attachment opening and fastening the strap end to itself by Velcro™ tape). The right and left straps are preferably provided with two coordinating ends of a buckle or other detachable locking mechanism (not shown), which is buckled behind the seat back to secure the device vertically in place at a position which is proper to the individual user. Alternatively, a single adjustable strap (not shown) may be looped through the attachment openings 13 across the back of the support 1, and the strap may be used to engage a portion of the car seat back to secure the support against the seat back. Preferably, the support allows a limited degree of vertical motion even when strapped in. A range of vertical motion may be beneficial to reduce differential motion between seat cushion and backrest, thereby reducing one factor of lumbar stress in automotive use. To prevent damage to the foam on the edge of the wings when the device is in use, removable wing caps (not shown) may be provided to cover the wing extremities, the caps lodging within the wing cap recesses 12 provided. It will be understood that the invention is not limited to automotive use, but may be applied in conjunction with any type of seating, including wheelchairs and other assistive seating.

What is claimed is:

1. A support device for use in supporting a user from the occipital region of the user's skull to the coccygeal region of the user's spine while the user is in a seated position, the support device comprising:

a lower section with a front side and a back side, the lower section adapted to extend at least from the coccygeal region of the user's spine, and to provide lateral support portions adapted to extend at least partially around the user's hips to assist with positioning the user in the support device and in preventing side-to-side movement of the user's hips;

a top section with a front side and a back side, the top section adapted to extend at least from the occipital region of the user's skull; and an intermediate section with a front side and a back side, the intermediate section extending between the lower section and the top section, the intermediate section having a first concavity on a front surface of the intermediate section, the first concavity adapted to receive and support the user's thoracic spine, the intermediate section also having a first convexity on the front surface of the intermediate section, the first convexity adapted to receive and support the user's lumbar, sacral and coccygeal spines, the first convexity merging with the concavity;

wherein the support device has a top end, a bottom end, a front surface, and a back surface, and wherein the front surface of the support device is formed from and extends along the front sides of the lower section, the intermediate section, and the top section, the front surface of the support device formed to generally contour with the user's neck and back and formed from a material that is adapted to generally maintain its shape to provide support to the user when positioned between the user and a back of a chair, and wherein the support device is adapted to extend from the top end at the top section from at least the occipital region of the user's skull to the bottom end at the lower section to at least the coccygeal region of the user's spine.

2. The support device of claim 1, wherein the front surface of the support device comprises a sinuously curved front surface adapted to generally contour with the neck and the back of the user to follow the contours of the user's spine.

3. The support device of claim 1, wherein the lower section includes a width that extends between a first side and a second side of the lower section, the intermediate section includes a width that extends between a first side and a second side of the intermediate section, the width of the lower section adapted to be greater than the width of the intermediate section, and the lateral support portions of the lower section adapted to curve around the user's hips on both sides to form two iliac support wings.

4. The support device of claim 1, wherein the intermediate section includes a spinal support member adapted to be sufficiently narrow to lie substantially flush with the user's back proximate to the user's spine in a space formed between the user's scapulae.

5. The support device of claim 1, wherein the intermediate section includes a spinal support member adapted to be sufficiently narrow to permit the user's shoulders to rotate substantially without obstruction in a sideward direction.

6. The support device of claim 1, wherein the top section further includes:

a second concavity on a front surface of the top section of the support device, the second concavity adapted to receive and support the rear of the user's head proximate to the user's occipital; and a second convexity comprising a neck-supporting ridge formed on the front surface of the top section of the support device, the neck-supporting ridge adapted to receive and support the user's cervical spine, the neck-supporting ridge merging with the second soncavity on the front surface of the top section.

7. The support device of claim 1, wherein the support device includes:

a plurality of openings formed and extending from the front side to the back side of the support device to permit air circulation.

8. The support device of claim 1, wherein the support device is formed with a ridge plastic armature.

9. The support device of claim 8, wherein the support device further includes:

a foam exterior substantially covering the armature.

10. A method for supporting a user from the occipital region of the user's skull to the coccygeal region of the user's spine while the user is in a seated position, the method comprising:

providing the user with a support device, wherein the support device includes:

a lower section with a front side and a back side, the lower section adapted to extend at least from the coccygeal region of the user's spine, and to provide lateral support portions adapted to extend at least partially around the user's hips to assist with positioning the user in the support device and in preventing side-to-side movement of the user's hips;

a top section with a front side and a back side, the top section adapted to extend at least from the occipital region of the user's skull; and an intermediate section with a front side and a back side, the intermediate section extending between the lower section and the top section, the intermediate section having a first concavity on a front surface of the intermediate section, the first concavity adapted to receive and support the user's thoracic spine, the intermediate section also having a first convexity on the front surface of the intermediate section, the first convexity adapted to receive and support the user's lumbar, sacral and coccygeal spines, the first convexity merging with the concavity;

wherein the support device has a top end, a bottom end, a front surface, and a back surface, and wherein the front surface of the support device is formed from and extends along the front sides of the lower section, the intermediate section, and the top section, the front surface of the support device formed to generally contour with the user's neck and back and formed from a material that is adapted to generally maintain its shape to provide support to the user when positioned between the user and a back of a chair, and wherein the support device is adapted to extend from the top end at the top section from at least the occipital region of the user's skull to the bottom end at the lower section to at least the coccygeal region of the user's spine.

11. A support device for use in supporting a user from the occipital region of the user's skull to the coccygeal region of the user's spine while the user is in a seated position, the support device comprising:

a lower section with a front side and a back side, the lower section adapted to extend at least from the coccygeal region of the user's spine, and to provide lateral support portions adapted to extend at least partially around the user's hips to assist with positioning the user in the support device and in preventing side-to-side movement of the user's hips;

a top section with a front side and a back side, the top section adapted to extend at least from the occipital region of the user's skull; and an intermediate section with a front side and a back side, the intermediate section extending between the lower section and the top section, the intermediate section having a first concavity on a front surface of the intermediate section, the first concavity adapted to receive and support the user's thoracic spine, the intermediate section also having a first convexity on the front surface of the intermediate section, the first convexity adapted to receive and support the user's lumbar, sacral and coccygeal spines, the first convexity merging with the concavity;

wherein the support device has a top end, a bottom end, a front surface, and a back surface, and wherein the front surface of the support device is formed from and extends along the front sides of the lower section, the intermediate section, and the top section, the front surface of the support device formed to generally contour with the user's neck and back and formed from a material that is adapted to generally maintain its shape to provide support to the user when positioned between the user and a back of a chair, wherein the support device is adapted to extend from the top end at the top section from at least the occipital region of the user's skull to the bottom end at the lower section to at least the coccygeal region of the user's spine, wherein the support device is formed with a rigid plastic armature that is substantially covered with a foam exterior; and wherein the support device has a plurality of openings formed and extending from the front side to the back side of the support device to permit air circulation.

* * * * *